US011818321B2

(12) United States Patent
Kallio et al.

(10) Patent No.: US 11,818,321 B2
(45) Date of Patent: Nov. 14, 2023

(54) COLOR CALIBRATIONS FOR PERCEPTUAL SIMILARITY BETWEEN MULTIPLE DISPLAYS

(71) Applicant: Microsoft Technology Licensing, LLC, Redmond, WA (US)

(72) Inventors: Samu Matias Kallio, Redmond, WA (US); Kari Jussi Ropo, Redmond, WA (US); Baek-Woon Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/245,065

(22) Filed: Apr. 30, 2021

(65) Prior Publication Data

US 2022/0353387 A1 Nov. 3, 2022

(51) Int. Cl.
*H04N 1/60* (2006.01)
*G06F 3/14* (2006.01)
*G06F 18/22* (2023.01)

(52) U.S. Cl.
CPC ......... *H04N 1/6052* (2013.01); *G06F 3/1423* (2013.01); *G06F 18/22* (2023.01)

(58) Field of Classification Search
None
See application file for complete search history.

(56) References Cited

U.S. PATENT DOCUMENTS

| 2002/0003544 | A1  | 1/2002  | Ohtsuka et al. |
| 2011/0242142 | A1* | 10/2011 | Hussain ................ G06F 3/1446 345/690 |
| 2015/0277840 | A1* | 10/2015 | Ninan .................... G09G 5/026 345/589 |
| 2016/0261860 | A1* | 9/2016  | Gu ........................ G09G 3/006 |
| 2017/0069293 | A1  | 3/2017  | Christmann et al. |
| 2021/0056877 | A1  | 2/2021  | Chew et al. |
| 2022/0172693 | A1* | 6/2022  | Tsai ...................... G06F 3/1446 |
| 2022/0230596 | A1* | 7/2022  | Shiau ................... G09G 3/3413 |

OTHER PUBLICATIONS

"International Search Report and Written Opinion Issued in PCT Application No. PCT/US22/023571", dated Oct. 5, 2022, 24 Pages.
"Invitation To Pay Additional Fees Issued in PCT Application No. PCT/US22/023571", dated Aug. 10, 2022, 16 Pages.

* cited by examiner

*Primary Examiner* — Patrick F Valdez
(74) *Attorney, Agent, or Firm* — Holzer Patel Drennan

(57) ABSTRACT

A method for calibrating the color space on multiple displays in a computing system includes determining a native color space for each of multiple displays; dynamically selecting a target color space to implement on each of the multiple displays based at least in part on the determined native color space of each one of the multiple displays; and instructing one of the multiple displays to map the associated native color space to the target color space.

17 Claims, 7 Drawing Sheets

US 11,818,321 B2

COLOR CALIBRATIONS FOR PERCEPTUAL SIMILARITY BETWEEN MULTIPLE DISPLAYS

BACKGROUND

Different displays may have different capabilities. Current calibration methods typically provide for mapping the color space available on a given display to a uniform, industry standard color space.

Increasingly, users work environments are being adapted to include multiple displays. Additionally, some individual computing devices on the market incorporate two or more displays into a same product.

SUMMARY

According to one implementation, a method for calibrating the color space of multiple displays in a computing system provides for determining a native color space for each of multiple displays; selecting a target color space to implement on each of the multiple displays based at least on part on the determined native color space of each one of the multiple displays; and instructing one of the multiple displays to map the associated native color space to the target color space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

BRIEF DESCRIPTIONS OF THE DRAWINGS

DETAILED DESCRIPTION

Figure 1:
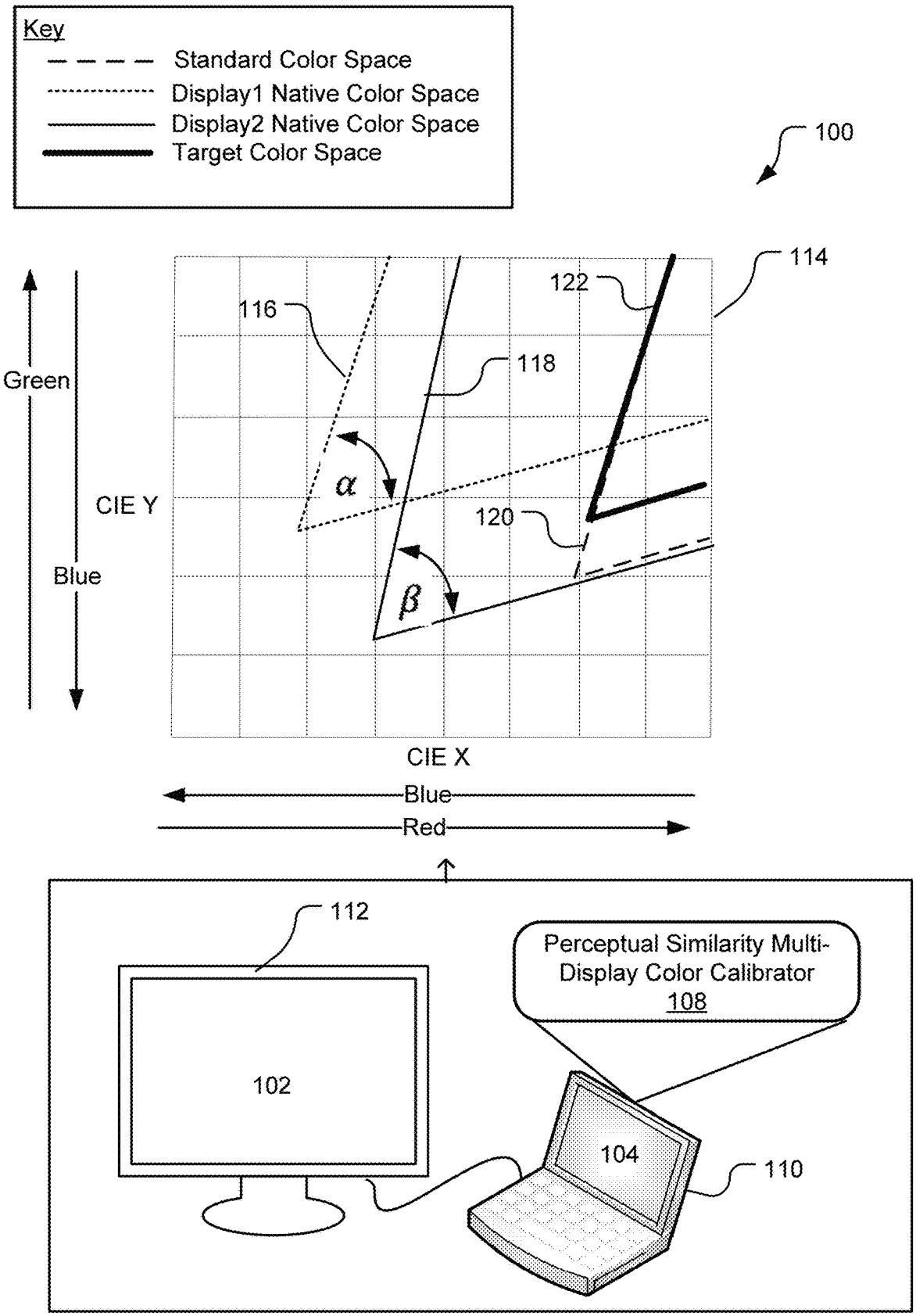
FIG. 1 illustrates an example system that implements color calibrations for perceptual similarity between multiple displays.

While existing calibration techniques provide acceptable levels of accuracy for different displays in isolation, many calibrations may still allow for significant color variation between displays. Such variations may be especially apparent when, for example, two or more displays are arranged side-by-side while presenting the same picture. In these multi-display use cases, a lack of perceptual similarity in the implemented target color spaces can be quite noticeable, visually unappealing, and detract from the user experience.

Display color calibration maps native color space of a display to a standard color space definition. This calibration ensures, for example, that each illuminated pixel has a color that is most "accurate," where "accuracy" implies a degree of similarity between the actual color on the display screen and a corresponding color within the standard color space (e.g., a color intended by a content developer).

Due to differing native color spaces, accuracy-based color calibrations on different displays can lead to dramatic differences in perceptual color similarity. If, for example, a particular display is not capable of rendering certain colors within the standard color space, an accuracy-based color calibration may be performed to identify and implement a shift of the native color space in a first direction that results in a target color space that is "closest" to the standard color space. Notably, two displays with slightly different capabilities may implement the same calibration and selectively implement color shifts in that are in different directions or of different magnitudes to achieve a target color space closest to the standard definition. Consequently, both displays implement a target color space that is as accurate as possible relative to the to the standard color space given the respective capabilities of each display; however, the two resulting target color spaces may look very different from one another.

The herein disclosed technology provides for color calibrations designed to ensure "perceptual similarity" between multiple displays. As used herein, perceptual similarity refers to the degree of pixel-to-pixel color similarity apparent to a user when viewing two or displays presenting identical pictures. According to one implementation, the herein disclosed methodology provides color calibrations that are based on a combination of accuracy (as defined above relative to a "standard color space") in addition to perceptual similarity. For example, a group of two or more displays may be jointly calibrated so as to ensure that the color space implemented on each such display is (1) as accurate as possible relative to a standard color space and also (2) perceptually similar enough to other displays in the group such that color differences between corresponding pixels are not detectable to a user. The disclosed color calibration methodology may be factory implemented (e.g., on pairs or groups of displays that may be incorporated into a same multi-display device or system) or dynamically implemented in-the-field, when the displays are in possession of an end user (e.g., when a user couples one display to another).

FIG. 1 illustrates an example system 100 that implements color calibrations for perceptual similarity between multiple displays. Although the disclosed color calibrations may be implemented on any number of displays, the system 100 illustrates aspects of a dual-display calibration to map the native color spaces of a first display 102 and a second display 104 to a same target color space. To illustrate one of many example use cases, the first display 102 is shown to be included in a monitor 112 while the second display 104 is included in a laptop 110. The laptop 110 is shown to be coupled (via a coupling 106) to the monitor 112 such that both displays are used within a same user computing environment. Notably, the coupling 106 may be wired or wireless. In other implementations, the first display 102 and the second display 104 are integrated within a same computing device, such as a dual or tri-screen personal electronic device.

A processor within the system 100 executes a "perceptual similarity multi-display color calibrator 108" to calibrate the color space of the first display 102 and the second display 104 relative to one another. Aspects of this calibration are shown with respect to color space plot 114. Specifically, the color space plot 114 illustrates a portion of a first native color space 116 that is of the display 102 and a second native color space 118 that is for the display 118. In general, color space plots may be depicted in two or three dimensions. The color space plot 114 is two dimensional, with blue tones increasing toward in proximity to the x/y origin, green tones increasing with distance along the y-axis from the x/y origin, and red tones increasing with distance along the x-axis with distance from the x/y origin.

The first native color spaces 116 and the second native color space 118 may be understood as representing the range of colors that may be output by the corresponding displays 102 and 104, respectively, without adjustment or calibration, in response to controlling pixels according to a range of voltages that map to a full range of color capabilities of the display. The color space plot 114 indicates, generally, that the first display 102 is capable of generating colors internal to an exemplary angle "α" and that the second display 104 is capable of generating colors internal to an exemplary angle "β." In this sense, plot regions internal to angles α and β represent the color space capabilities of the first display 102 and second display 104, respectively, while the regions the regions external to these angles are said to "exceed color space limits" of the associated display.

As used herein, the term "color space limits" refers to the outer-most bounds of a native color space for a given display. That is, the dotted line representing "display 1 native color space" (the first native color space 116) represents the color space limits of the first display 102 while the solid line representing "display 2 native color space" (the second native color space 118) represent the color space limits for the second display.

In addition to the first and second native color spaces 116 and 118, the color space plot 114 also depicts a standard color space 120. The standard color space 120 represents a predefined color space definition that is utilized uniformly (e.g., across many display devices in the industry) as a benchmark for accuracy. Stated differently, a display may be calibrated for accuracy by mapping the display's native color space to the standard color space 120 (e.g., if the standard color space is within the capabilities of the display) or to an available color space that is deemed closest to the standard color space 120 (e.g., if the standard color space partially exceeds the capabilities of the display).

Calibrations based exclusively on accuracy to the standard color space can introduce a high degree of perceptual dissimilarity from one display to another. For this reason, the perceptual similarity multi-display color calibrator 108 does not necessarily map the native color spaces 116, 118 to the standard color space 120. Rather, the perceptual similarity multi-display color calibrator 108 maps the native color spaces 116, 118 to a dynamically-identified "target color space 122" that is chosen, at least in part, to ensure a predefined degree of perceptual similarity between the displays 102, 104 implementing the target color space 122.

In one implementation, the target color space 122 is selected dynamically, based on determined color space capabilities of the first display 102 and the second display 104 (e.g., the native color spaces 116, 118) as well as upon the standard color space 120. For example, the target color space 122 may represent a color space that is highly similar (e.g., as close as possible) to the standard color space 120 but that is also within or close enough to the color space limits of the displays 102, 104 such that a user would be unable to notice any differences in color between identical pictures rendered on the first display 102 and the second display 104. This methodology, discussed in detail with respect to the following figures, provides an ideal tradeoff between absolute accuracy to a predefined standard color space definition and relative similarity between different displays, particularly displays that are to be used within a same computing system or local physical environment.

In different implementations, logic of the perceptual similarity multi-display color calibrator 108 may be stored and/or executed locally (e.g., on one or more devices of the computing system 100), remotely, such as on one or more cloud-based servers coupled to the computing system 100, or a combination of local and remote storage and/or execution. In FIG. 1, the perceptual similarity multi-display color calibrator 108 is may be understood as being stored in memory accessible to the laptop device 110 (e.g., either local memory or cloud-based storage) and executed, at least in part, by a local processor of the laptop device 110. For example, the perceptual similarity multi-display color calibrator 108 may be implemented by an operating system or application of the laptop device 110. In at least one implementation, the perceptual similarity multi-display color calibrator 108 is executed during a factory calibration and, in such case, may not be stored or executed locally on the computing system 100.

Figure 2:
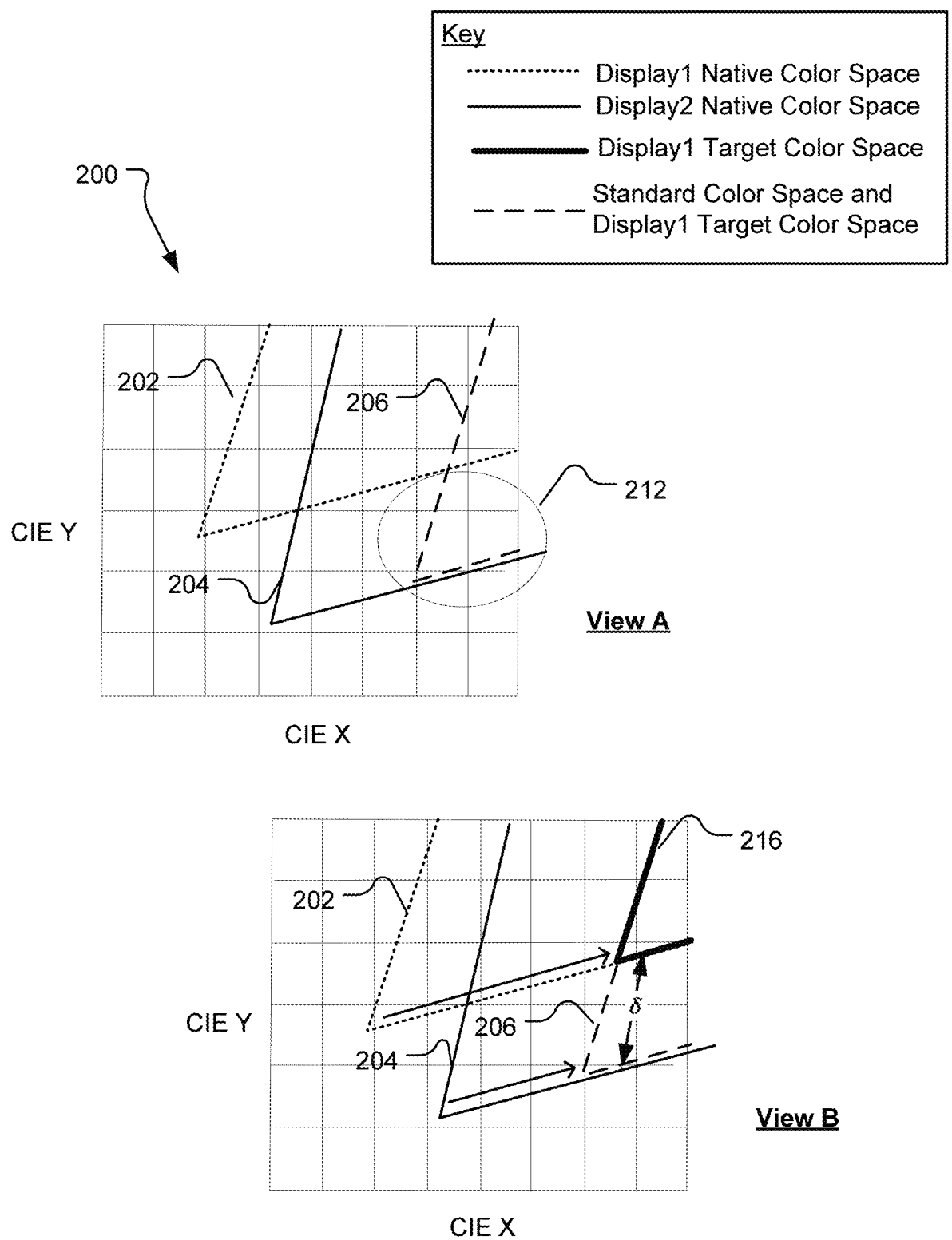
FIG. 2 illustrates an example aspects of an accuracy-based display color calibration performed on multiple displays.

FIG. 2 illustrates an example aspects of an accuracy-based display color calibration 200. While the herein-disclosed systems may perform color calibrations that are, in part, based on accuracy, the herein disclosed methodologies also expand upon calibrations of the type discussed with respect to FIG. 2 to provide additional benefits, such as to ensure higher degrees of perceptual similarity between two or more displays. Thus, FIG. 2 and the accompanying description below are primarily intended provide context for the improvements upon such methods described with respect to FIG. 3-6.

By example and without limitation, View A of FIG. 2 illustrates a color space plot that depicts a first native color space 202 for a first display and a second native color space 204 for a second display. Additionally, View A further depicts a standard color space definition 206. Notably, the standard color space definition 206 is fully within the capabilities of the second display with the second native color space 204. That is, color space limits of the standard color space definition 206 are fully internal to the color space limits of the second native color space 204. For a most "accurate" color space calibration, the second native color space 204 may be mapped, via a calibration, to the standard color space 206 (e.g., if the display is capable of implementing the standard color space) or to a target color space that is as close as possible to the standard color space 206 while remaining fully within the capabilities of the display.

In the example of FIG. 2, the first display and the second display have differing capabilities represented by their diverse native color spaces 202, 204. Consequently, the standard color space definition 206 is not fully internal to the color space limits of the first native color space 202. That is, a portion of the standard color space definition 206 internal to a region 212 exceeds the limits of the first native color space 202. Therefore, a perfect mapping of the first native color space 202 to the standard color space definition 206 is not possible (e.g., because there is no unique pixel-to-pixel mapping for all pixels in the two color spaces). In this case, an accuracy-based calibration may provide for a mapping of the first native color space 202 to a target color space 216 (see View B) representing a color space of equal size/range to the standard color space 206 that is shifted to be fully within the capabilities of the first display (e.g., fully overlapping with the first native color space 202).

View B of FIG. 2 illustrates exemplary post-calibration mappings that are achieved via the above-described methodology. Following the calibration, each pixel of the second native color space 204 is mapped to a corresponding pixel within the standard color space 206. The mapping of the second native color space 204 to the standard color space 206 represents a completely accurate mapping in the sense that the standard color space definition 206 represents the color space that is ultimately implemented on the first display. In contrast, the first native color space 202 is mapped to the target color space 216, which is similar to the standard color space 206 but shifted such that it is entirely internal to the limits of the first native color space 202. This mapping of the first native color space 202 represents a color space mapping for the first display that is not completely accurate, but that is as accurate as possible to the standard color space 206 while remaining internal to the color space limits of the first display.

Notably, there exists a substantial offset ($\delta$) between the standard color space definition 206 and the target color space 216. Without further constraints in play during the above-described calibration, this offset ($\delta$) could easily be large enough to be detectable to the human eye. Thus, the two calibrated displays may look very different from one another when displaying identical pictures.

Figure 3:
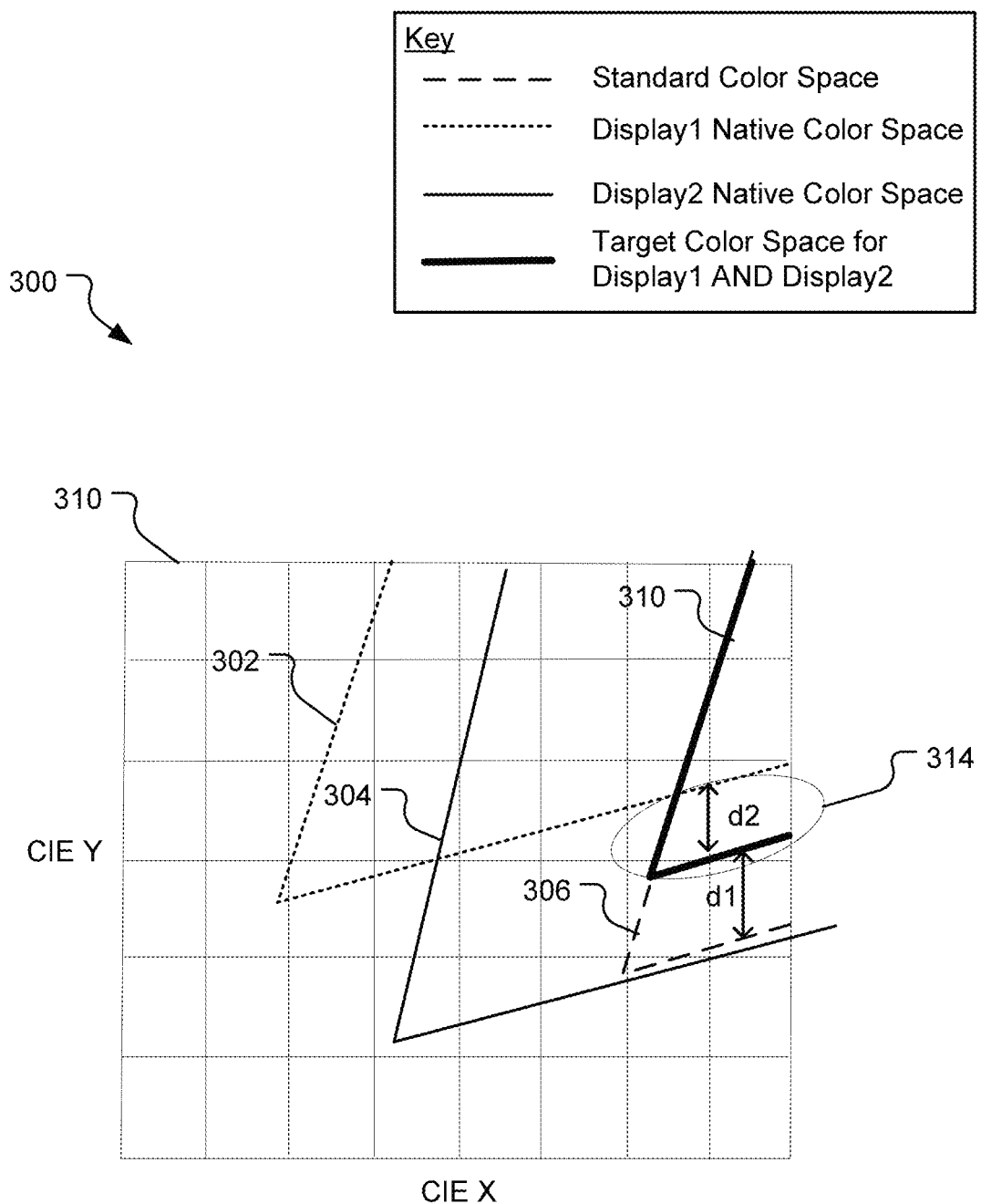
FIG. 3 illustrates example aspects of a multi-display color calibration that is based on both accuracy relative to a standard color space definition and perceptual similarity between calibrated displays.

FIG. 3 illustrates example aspects of a multi-display calibration 300 that is based on both accuracy relative to a standard color space definition and perceptual similarity between calibrated displays. Specifically, FIG. 3 illustrates a plot 310 that depicts a first native color space 302 for a first display and a second native color space 304 for a second display. The plot 310 also depicts a standard color space 306 with characteristics as defined above (e.g., a uniform color space used across the industry as a baseline for accuracy).

According to one implementation, the standard color space 306 is used as a parameter in the multi-display calibration 300; however, this standard color space 306 is not necessarily used as a target for a mapping of either of the native color spaces 302, 304. In contrast to the accuracy-based calibration of FIG. 2 (e.g., where each of the different native color spaces is mapped to a different target space representing a best-available match to the standard color space), the multi-display calibration technique 300 provides for mapping both the first native color space 302 and the second native color space 304 to a same target color space 310 that may or may not be entirely within the limits of both of the native color spaces. The target color space 310 is dynamically chosen, based on both of the standard color space 306 also on the color space capabilities of the two displays.

According to one implementation, the multi-display calibration 300 accepts as an input parameter a predefined "max perceptual similarity delta" that represents a maximum permissible offset (e.g., difference in color) between corresponding pixels on the calibrated displays when such displays are displaying identical images. In one implementation, the maximum perceptual similarity delta is defined to represent a maximum pixel offset that is visually detectable to a human viewing the multiple displays. Notably, this detectable difference is quite complex and may vary based on color(s) appearing on the displays as well as on product design. For example, 1 of CIEDE20000 ("1 delta E") is often considered to be a baseline, in the industry for understanding this perceivable difference. However, if two color surfaces large and they connect to one another, humans may be capable of detecting ~0.5 DE difference. On the other hand, if two color surfaces are not connected, ~2 DE may be the perceivable threshold. Although the maximum perceptual similarity delta may therefore be dependent upon the product design, it is—in one example implementation—2 DE. The maximum perceptual similarity delta may be a single pixel value offset (e.g., 2 DE) or an array of different offset values (e.g., with different values being defined for different colors). This max perceptual similarity delta provides a key constraint in the selection of the target color space 310, as is discussed further below.

In one implementation, the multi-display calibration 300 includes logic that identifies an overlap region between the first native color space 302 and the second native color space 304 and that assesses the extent to which the standard color space definition 308 is within that overlap region. If the standard colors space definition 306 happens to be completely internal to the color space limits of each of the first native color space 302 and the second native color space 304 (e.g., within the capabilities of the two displays), the standard color space definition 306 is selected as the target color space for the mapping that is to be implemented on each of the two displays. If, however, the standard color space definition 306 is partially external to the color space limits of a first one of the displays, logic is then employed to select a shift (d1) of the standard color space 306 to a target color space that is within or closer to the limits of first display than the standard color space 306. In FIG. 3, the standard color space definition 306 is partially external to the color space limits of the first native color space 302. The shift d1 of the standard color space 306 defines a dynamically-selected target color space 310 that more closely overlaps with the first native color space 302 than the standard color space 306. By using the overlap between the two color spaces 302, 306 as a basis for defining the dynamically-selected target color space 310 that is used in the color calibration (mapping), it is ensured that the two displays can be calibrated for similarity to one another rather than similarity to a color standard, ultimately resulting in a lesser perceivable color differential between the two displays.

According to one implementation, the shift d1 between the standard color space 306 and the target color space 310 is selected to be as small as possible (e.g., maximizing accuracy with respect to the standard color space) while also ensuring that a resulting offset d2 between the target color space 310 and first native color space 302 of the first display is less than the predefined max perceptual similarity delta. With reference to FIG. 3, the offset d1 is also referred to herein as an "accuracy offset" (e.g., defining a shift in the accuracy from the standard color space and the selected target color space) while the shift d2 is referred to as the perceptual similarity offset (e.g., defining a shift between the selected target color space 310 and the outer limits supported by the native color space of the display that is unable to implement the standard color space 306).

By example and without limitation, the above-described logic may be implemented by an algorithm that minimizes or otherwise constrains d1 to below an offset while guaranteeing that each implementation of the selected target color space "looks" identical to a user on account of the constraint placed on d2 (e.g., requiring that perceptual similarity offset d2 be less than the predefined max perceptual similarity offset).

Stated differently, the first display with the first native color space 302 and the second display with the second native color space 304 are each calibrated to implement a mapping to the same target color space (310) that is selected as defined above based on the color space capabilities of the two displays, the standard color space 306, and the predefined maximum perceptual similarity delta.

In the example of FIG. 3, the second display implements the selected target color space 310 with complete accuracy because the target color space 310 is completely internal to the color space limits of the second native color space 304. The first display, in contrast, implements the selected target color space 310 with a small degree of inaccuracy due to the fact that it is incapable of precisely implementing some colors of the selected target color space 310 corresponding to a region 314 external to the first native color space 302. When receiving instructions to control pixels within the range of the region 314, the first display may default to presenting such colors according to a closest-available color, defined by a shift d2 from each pixel. However, the degree of this shift d2 (representing the offset between the selected target and the achievable mapping), is small enough that a user is unable to notice a difference. This, in effect, guarantees that the first and second displays look the same to an end user.

Figure 4:
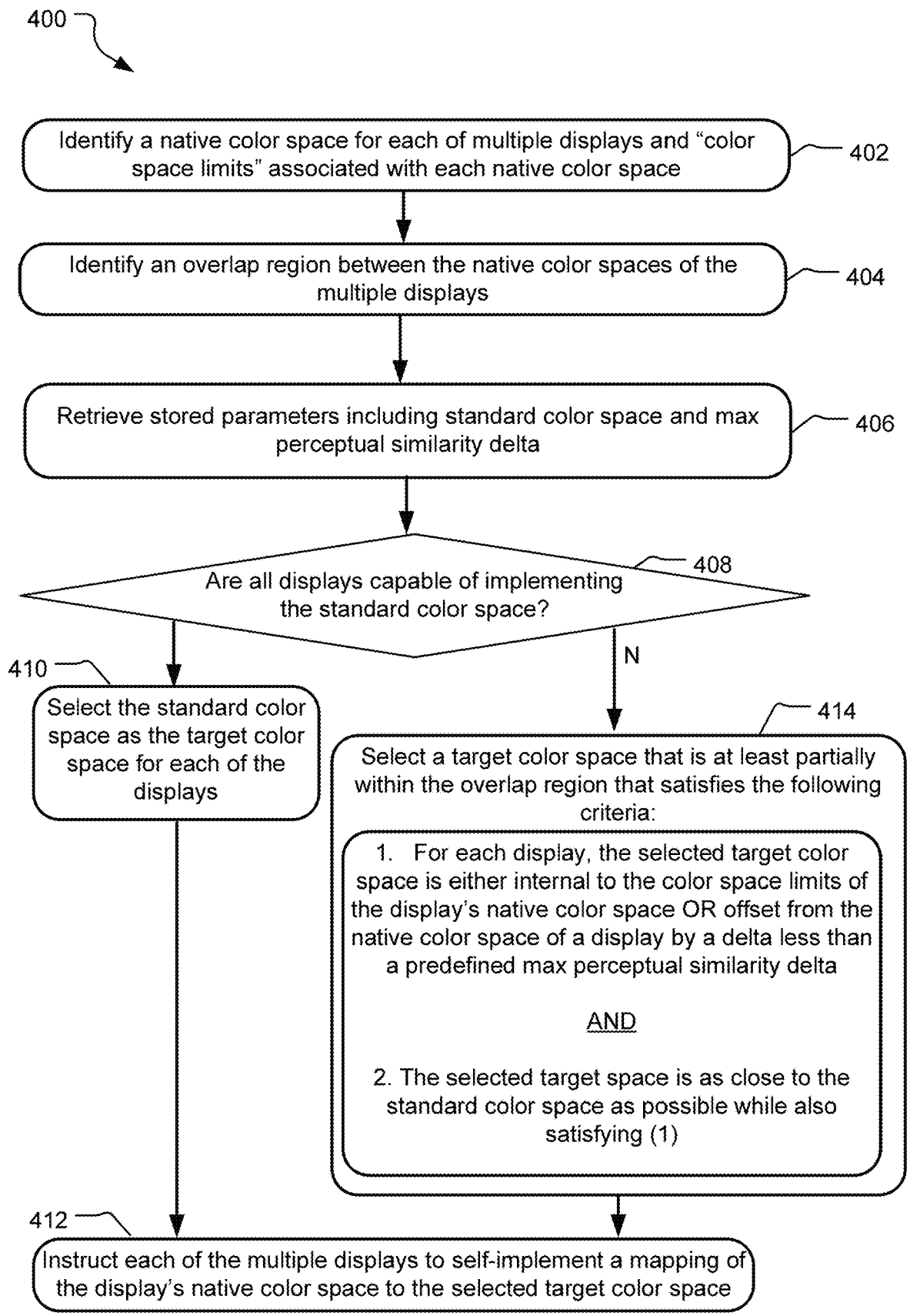
FIG. 4 illustrates example operations for performing a color calibration for multiple displays that is based on both accuracy relative to a standard color space definition and perceptual similarity between the multiple displays.

FIG. 4 illustrates example operations 400 for performing a color calibration for multiple displays that is based on both accuracy relative to a standard color space definition and perceptual similarity between the multiple displays. According to one implementation, the operations 400 are performed during a factory calibration process. In another implementation, the operations are performed in-the-field, when the displays are in the possession of an end user. For example, a system processor in communication with each of the displays may query the displays to acquire display characteristics, perform the calibration based on the acquired characteristics, and provide each display with a target color space to implement following the calibration.

An identification operation 402 identifies a native color space of each display and associated color space limits defining the bounds of each of the native color spaces. An identification operation 404 identifies a region of overlap between the various native color spaces. A retrieving operation 406 retrieves a stored parameters including a standard color space definition as well as a max perceptual similarity delta. Consistent with other uses of these terms here, the standard color space definition represents a uniform color space that may be used to provide a baseline for accuracy-based calibrations, while the max perceptual similarity delta represents a maximum shift in a display's color space that can be achieved without detection by the human eye. The max perceptual similarity delta is, for example, a prestored value or prestored array of values associated with different colors or ranges of color.

A determination operation 408 determines whether all of the displays are capable of implementing the standard color space (e.g., by determining whether the standard color space is fully internal to the color space limits of the native color space for each display. If all of the displays are capable of implementing the complete range of colors within the standard color space, a target selection operation 410 selects the standard color space as the target color space for each of the displays, and a control instruction 412 instructs each of the multiple displays to self-implement a mapping of the display's native color space to the selected target color space (e.g., the standard color space).

If the determination operation 408 determines that one or more of the displays is not capable of implementing the complete range of colors within the standard color space, a target selection operation 414 commences. The target selection operation 414 uses the determined overlap region, standard color space, and max perceptual similarity delta to dynamically select a target color space that is to be mapped to the native color space of each one of the displays.

The selection operation 414 may entail different sub-operations in different implementations. In the example of FIG. 4, the selection operation 414 entails execution of an algorithm that selects a target color space that is at least partially within the identified overlap region and that satisfies two requisite criteria. First, the algorithm ensures that the selected target space is—for each display—either (A) entirely internal to the color space limits of the display's native color space (e.g., within the capabilities of the display) or else (B) that the selected target color space is offset from (external to) the color space limits of the display by a delta that is less than the predefined max perceptual similarity delta. While ensuring satisfaction of the above, the algorithm still further ensures that the selected target space is as close to the target color space as possible.

Stated differently, the algorithm seeks to constrain the accuracy offset (e.g., below a threshold), such as by employing algorithmic methods to minimize the accuracy offset between the standard color space definition and the selected target while also ensuring that the target color space is either within the capabilities of each display or close enough to the native color spaces of each display such that any discrepancy between the target color space and the color space actually implemented by the display is not detectable to the human eye.

Responsive to the selection of a target color space that satisfies these criteria, the instruction operation 412 instructs each of the multiple displays to self-implement a mapping of the display's native color space to the selected target color space. Although it may be the case that one or more of the displays are incapable of implementing the selected target with complete accuracy, the resulting implementation of the target color space is still close enough that any discrepancies in implementation are indetectable to the end user.

Figure 5:
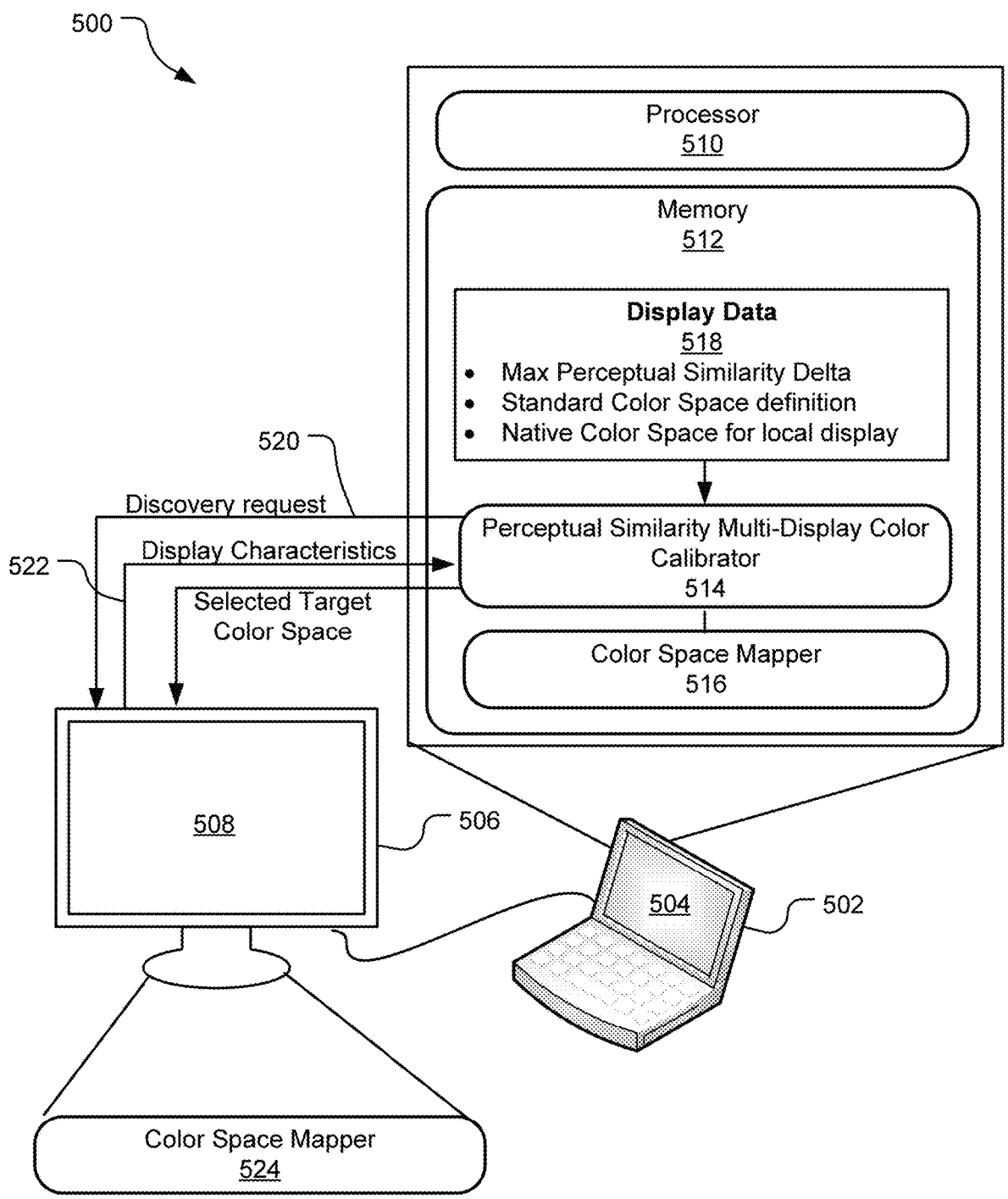
FIG. 5 illustrates an example computing system that implements a color calibration to map different native color spaces of multiple displays to a common, dynamically-selected target color space.

FIG. 5 illustrates an example computing system that implements a color calibration to map different native color spaces of multiple displays to a common, dynamically-selected target color space. The target color space is selected to ensure both accuracy (e.g., to a standard color space definition) and also to provide a predefined degree of perceptual similarity between the multiple displays being calibrated. Although the example of FIG. 5 pertains to a dual-display calibration between a laptop and a monitor, the disclosed calibration methodology is not limited to dual-display systems or to in-field calibrations between laptops and monitors; rather, the disclosed calibrations may be performed to jointly calibrate three or more displays for perceptual similarity and/or to calibrate a variety of diverse types of display devices relative to one another.

The exemplary system 500 includes a first display device 502 (e.g., a laptop) with a first display 504 and a second display device 506 (e.g., a monitor) with a second display 508. In the example shown, the first display device 502 includes at least a processor 510, memory 512 storing various applications that may be executed by the processor 510 including a perceptual similarity multi-display color calibrator 514 and a color space mapper 516. The memory 512 further stores various display data 518 such as characteristics of the first display 504 and/or parameters used in calibrating the first display 504 for perceptual similarity to other displays (e.g., the second display 508) that are coupled to a same computing system.

By example and without limitation that the perceptual similarity multi-display color calibrator 514 is, in FIG. 5, shown as being included within the first display device 502. In another implementation, aspects of the perceptual similarity multi-display color calibrator 514 are stored within and executed by the second display device 506 in addition to or in lieu of the first display device 502.

In the illustrated implementation, the second display device 506 is shown as including at least a color space mapper 524, which may include aspects similar or identical to the color space mapper 516 of the first display device 504. Thus, although not shown, the second display device 506 may have memory and processing elements for storing and executing the color space mapper 524. The color space mappers 516, 524 may be understood as including software, hardware, or a mix of hardware and software that maps the native color space of a local display to a designated target color space. The mapping is effective to cause the associated display device to control each display pixel in accord with the mapping. When, for example, a calibrated one of the display devices receives graphics data specifying x/y RGB values, each set of x/y RGB values is mapped, per a stored mapping, to a corresponding set of values within a selected target color space.

Returning to the example of FIG. 5, a color calibration is triggered by the initial coupling of the first display device 502 and the second display device 506. In one implementation, the first display device 502 launches the perceptual similarity multi-display color calibrator 514 in response to detecting the coupling to the second display device 506. Upon launch, the perceptual similarity multi-display color calibrator 514 transmits a discovery request 520 to the second display device 506, and the second display device 506 responds by transmitting back display characteristics 522 of the second display 508, including a native color space of the second display 508.

Responsive to receiving the display characteristics 522 for the second display 508, the perceptual similarity multi-display color calibrator 514 analyzes the received display characteristics in conjunction with the display data 518 that is locally stored for the first display 504. The perceptual similarity multi-display color calibrator 514 utilizes the discovered native color space of the second display 508 and the native color space of the first display 506 to dynamically select a target color space to implement on both displays, where the selected target color space is one that maximizes accuracy (e.g., consistency to a predefined standard color space) but yet can be implemented uniformly—without color discrepancies detectable to the human eye—on each display in the computing system.

In one implementation, this perceptual similarity multi-display color calibrator 514 implements the forgoing by performing the operations described in detail above with respect to FIG. 4. When the perceptual similarity multi-display color calibrator 514 identifies a target color space that meets criteria for both accuracy and perceptual similarity (e.g., the sub-operations described with respect to the selection operation 414 of FIG. 4), the perceptual similarity multi-display color calibrator 514 transmits the selected instructs the selected target color space 526 to the second display device 506 and instructs the color space mappers 516 and 524 of both devices to map the native color space of each display 504 or 508, respectively, to the selected target color space.

This dynamic, in-the-field calibration essentially allows for a shifting of the color space implemented by each display device for uniformity with other display devices that are configured for use in a same computing system. The dynamic calibration can be re-performed each time a new display coupling is detected.

Figure 6:
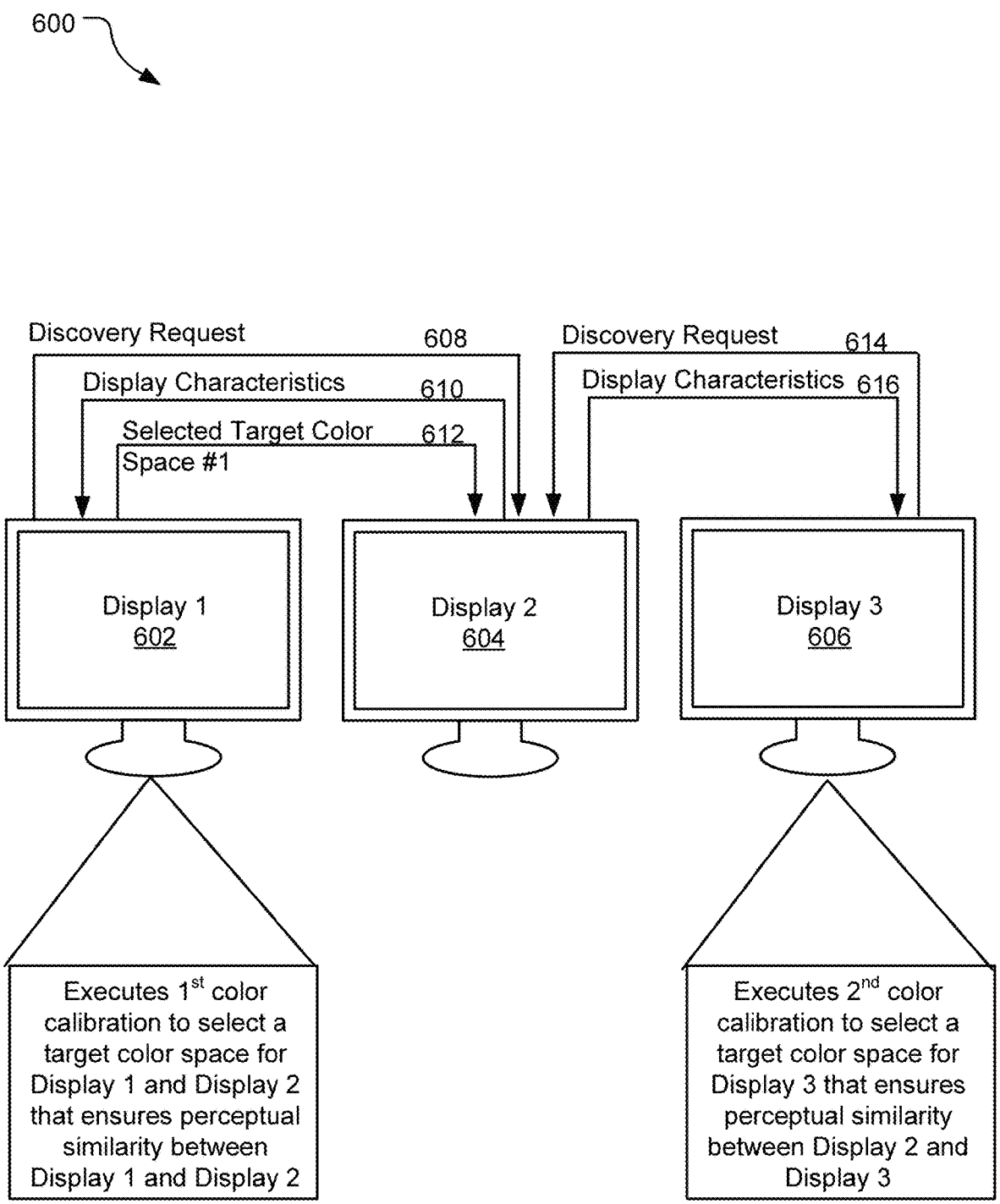
FIG. 6 illustrates an example system that implements a series of color calibrations to calibrate multiple displays for accuracy and perceptual similarity to one another.

FIG. 6 illustrates an example system 600 that implements a series of color calibrations to calibrate multiple displays for accuracy and perceptual similarity to one another. The system 600 includes at least three display devices—a first display device 602, a second display device 604, and a third display device 606—that are used together in a same computing system according to the relative positions shown (e.g., as a line of displays). Color calibrations are performed to ensure perceptual similarity between directly-adjacent displays in the line. For example, the first display device 602 and the second display device 604 are calibrated for perceptual similarity to one another and the third display device 606 is then calibrated for perceptual similarity to the second display device 604.

To achieve the foregoing, a first calibration is performed to map the native color spaces of the first display device 602 and the second display device 604 to a common target color space that is selected dynamically in a manner consistent with that described above with respect to FIGS. 4 and/or 5. In one non-limiting example, this is achieved by (1) a first transmission operation 608 that transmits a discovery request from the first display device 602 to the second display device 604; (2) a second transmission operation 610 that transmits display characteristics of the second display device 604 to the first display device 602 in response to the discovery request; (3) a calibration operation (not shown) performed at the first display device 602 to select a target color space, such as by performing operations the same or similar to those described above with respect to FIG. 4; and (4) a third transmission operation 612 that transmits a selected target color space from the first display device 602 to the second display device 604. Notably, the same result could be achieved by reversing the direction of transmission operations 608, 610, 612 and performing the first calibration at the second display device 604.

Following this first calibration, a second calibration may then be performed to map the native color space of the third display device 606 to a second color space that is dynamically selected based on the target color space already selected for the second display device 604.

In one implementation, this second calibration entails transmission operations further detailed in FIG. 6. Specifically, this second calibration may be achieved by: (1) a transmission operation 614 that transmits a discovery request from the third display device 606 to the second display device 604; (2) a transmission operation 616 that transmits display characteristics of the second display device 604, including the selected target color space for the second display device 604 to the third display device 606; and (3) a calibration operation (discussed below) performed on the third display device 606 to select a target color space self-implemented at the third display device 606.

In the above scenario, if the third display device 606 is capable of accurately (without color shift) implementing the target color space that has been selected for the second display device 604, this target color space of the second display device 604 may also be selected as the target color space of the third display device 606. If, however, the third display device 606 is not capable of accurately implementing the target color space already selected for the second display device 604, logic may be employed to determine a magnitude of the color shift that would be observed in the event that the third display device 606 attempted to imperfectly implement the target color space selected for the second display device 604. If, for example, the third display device 606 is capable of implementing the target color space selected for the second display device 604 without shifting any individual color from the target by an amount greater than the max perceptual similarity delta, the third display device 606 may still select the target color space of the second display as its own target for a native color space mapping.

If, in the above scenario, the third display device 606 is not capable of implementing the target color space of the second display device 604 without effecting color shifts greater that the max perceptual similarity delta, logic is employed to select a different target color space for the third display device 606 that is (1) as close to the target color space of the second display device 604 as possible while (2) ensuring that a relative shift in the target color spaces of the second display device 604 and the third display device 606 is not greater than the predefined max perceptual similarity delta.

In the above scenario, the first display device 602 and the second display device 604 are calibrated to implement a mapping to a first target color space and the third display device 606 is calibrated to implement a mapping to a second target color space. The target color spaces are either identical or close enough to one another that a user would not be able to notice any difference in the color space of the second display 604 as compared to the third display device 606. The above methodology could be further extended to calibrate any grouping of displays for perceptual similarity with other display(s) that are physically adjacent, thereby mitigating or eliminating the human-detectable color differences between directly adjacent pairs of displays.

Figure 7:
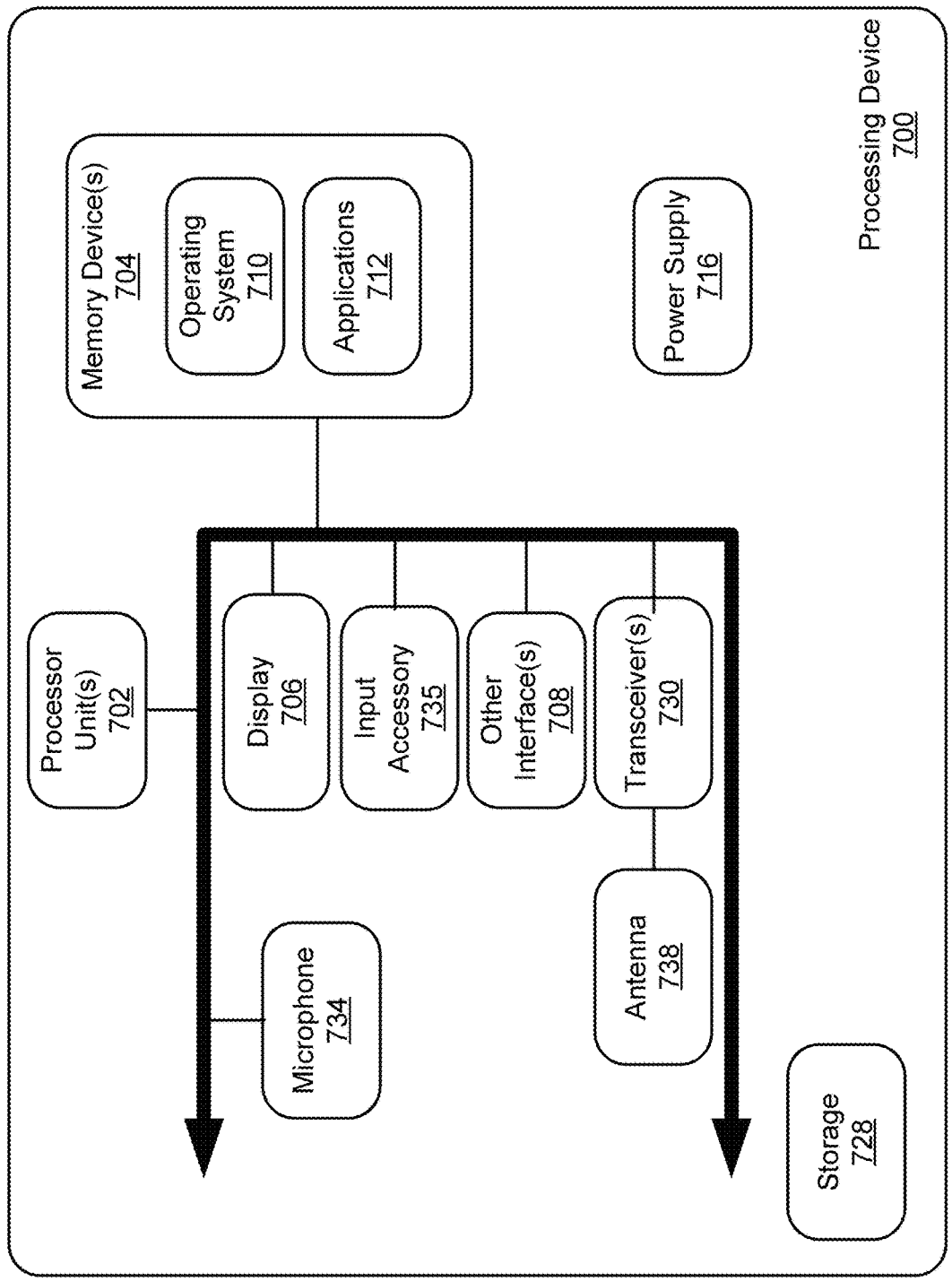
FIG. 7 illustrates an example schematic of a processing device suitable for implementing aspects of the disclosed technology

FIG. 7 illustrates an example schematic of a processing device 700 suitable for implementing aspects of the disclosed technology. The processing device 700 includes one or more processor unit(s) 702, memory 704, a display 706, and other interfaces 708 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a mixed reality device, resides in the memory 704 and is executed by the processor unit(s) 702, although it should be understood that other operating systems may be employed.

One or more applications 712, such as the perceptual similarity multi-display color calibrator 102 of FIG. 1 are loaded in the memory 704 and executed on the operating system 710 by the processor unit(s) 702. Applications 712 may receive input from various input devices such as a microphone 734, input accessory 735 (e.g., keypad, mouse, stylus, touchpad, gamepad, racing wheel, joystick), or inputs from various environmental sensors 736 such as one or more cameras, microphones, etc. The processing device 700 includes projection optics 732 for projecting virtual objects when operating in a virtual or mixed reality mode. The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

The processing device 700 includes one or more communication transceivers 730 and an antenna 738 to provide network connectivity (e.g., a mobile phone network, Wi-Fi®, Bluetooth®). The processing device 700 may also include various other components, such as a positioning system (e.g., a global positioning satellite transceiver), one or more accelerometers, one or more cameras, an audio interface (e.g., the microphone 734, an audio amplifier and speaker and/or audio jack), and storage devices 728. Other configurations may also be employed.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method disclosed herein provides for determining a native color space for each of multiple displays; selecting a target color space to implement on each of the multiple displays based at least in part on the determined native color space of each one of the multiple displays; and instructing one of the multiple displays to map the associated native color space to the target color space.

In an example method of any preceding method, selecting the target color space is further based on a predefined standard color space and an accuracy offset between the target color space and the predefined standard color space.

In yet another example method of any preceding method, selecting the target color space further comprises identifying an overlap region between the native color space of each one of the multiple displays, wherein the selected target color space at resides at least partially within the identified overlap region.

In still yet another example method of any preceding method, selecting the target color space further comprises defining, for each display of the multiple displays, color space limits that represent outer bounds of the native color space determined for the display, and determining a max perceptual similarity delta, where the max perceptual similarity represents a maximum shift in the native color space that can be implemented without being visually detectable by a human viewing the multiple displays. The selected target color space is either internal to the color space limits of each of the multiple displays or external to the color space limits of one or more displays by a delta less than the predefined max perceptual similarity delta.

In still yet another example method of any preceding method, selecting the target color space further comprises selecting the target color space to constrain an accuracy offset to below a threshold, the accuracy offset being an offset between a predefined standard color space and the target color space.

In still yet another example method of any preceding method, the multiple displays include at least a first display and a second display, and the method further comprises detecting a coupling between the first display and the second display. Based at least in part on the detection of the coupling, the native color space of each of the multiple displays is discovered by transmitting at least some display characteristics along the coupling; and instruction is transmitted along the coupling, where the instruction specifies the selected target color space.

In another example method of any preceding method, implementation of the selected target color space provides a predefined degree of perceptual similarity between identical pictures presented on each of the multiple displays.

In still yet another example method of any preceding method, implementing the selected target color space provides the predefined degree of perceptual similarity while also constraining an accuracy offset that exists between selected target color space and a predefined standard color space.

In yet still another example method of any preceding method, the multiple displays are implemented in a multi-display device.

An example system disclosed herein includes memory and a perceptual similarity multi-display color calibrator stored in the memory that is executable to: determine a native color space for each of multiple displays; select a target color space to implement on each of the multiple displays based at least on part on the determined native color space of each one of the multiple displays; and instruct one or more of the multiple displays to map the associated native color space to the target color space.

In another example system of any preceding system, the perceptual similarity multi-display color calibrator selects the target color space based on a predefined standard color space and an accuracy offset between the target color space and the predefined standard color space.

In still another example system of any preceding system, the perceptual similarity multi-display color calibrator is further executable to identify an overlap region between the native color space of each one of the multiple displays, the selected target color space residing at least partially within the identified overlap region.

In still yet another example system of any preceding system, the perceptual similarity multi-display color calibrator is further executable to: define color space limits that represent outer bounds of the native color space determined for each display and determine a max perceptual similarity delta representing a maximum shift in the native color space that can be implemented without being visually detectable by a human viewing the multiple displays. The selected target color space is either internal to the color space limits of each of the multiple displays or external to the color space limits of one or more displays by a delta less than the predefined max perceptual similarity delta.

In yet another example system of any preceding system, the target color space is a color space that constrains an accuracy offset between a predefined standard color space and the target color space.

In still yet another example system of any preceding system, the multiple displays include at least a first display and a second display and the perceptual similarity multi-display color calibrator is further executable to detect a coupling between the first display and the second display. Based at least in part on the detection of the coupling, the native color space of each of the multiple displays is discovered by transmitting at least some display characteristics along the coupling, and an instruction specifying the selected target color space is transmitted along the coupling.

In yet another example system of any preceding system, the selected target color space provides a predefined degree of perceptual similarity between identical pictures presented on each of the multiple displays.

In yet still another example system of any preceding system, implementation of the selected target color space provides the predefined degree of perceptual similarity while also constraining a size of an accuracy offset that exists between selected target color space and a predefined standard color space.

An example tangible computer-readable storage media disclosed herein implement computer-executable instructions for executing a computer process that comprises determining a native color space for each of multiple displays; selecting a target color space to implement on each of the multiple displays based at least on part on the determined native color space of each one of the multiple displays; and instructing one of the multiple displays to map the associated native color space to the target color space.

In another example tangible computer-readable storage media of any preceding storage media, the computer process further comprises selecting the target color space based on a predefined standard color space and an accuracy offset between the target color space and the predefined standard color space.

In still another example tangible computer-readable storage media of any preceding storage media, the computer process further comprises identifying an overlap region between the native color space of each one of the multiple displays, wherein the selected target color space at resides at least partially within the identified overlap region.

An example system disclosed herein includes a means for determining a native color space for each of multiple displays; a means for selecting a target color space to implement on each of the multiple displays based at least in part on the determined native color space of each one of the multiple displays; and a means for instructing one of the multiple displays to map the associated native color space to the target color space.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

What is claimed is:

1. A method comprising:
   determining a native color space for each of multiple displays;
   determining a max perceptual similarity delta, the max perceptual similarity delta representing a maximum shift in the native color space that can be implemented without being visually detectable by a human viewing the multiple displays;
   identifying an overlap region between the native color space of each of the multiple displays;
   in response to determining that a predefined standard color space is partially external to the overlap region, identifying an accuracy offset in the predefined standard color space that is effective to reduce a separation between the predefined standard color space and the overlap region to at or below the max perceptual similarity delta while satisfying a constraint limiting a size of the accuracy offset;
   selecting a target color space to implement on each of the multiple displays, the target color space being the predefined standard color space shifted by the accuracy offset; and
   instructing one of the multiple displays to map the associated native color space to the target color space.

2. The method of claim 1, wherein the constraint minimizes the size of the accuracy offset.

3. The method of claim 1,
   wherein the target color space resides at least partially within the overlap region.

4. The method of claim 3, wherein selecting the target color space further comprises:
   selecting the target color space to constrain the accuracy offset to below a threshold.

5. The method of claim 1, wherein the multiple displays include at least a first display and a second display and the method further comprises:
   detecting a coupling between the first display and the second display;
   based at least in part on the detection of the coupling, discovering, by a processor, the native color space of each of the multiple displays by transmitting at least some display characteristics along the coupling; and
   transmitting an instruction along the coupling, the instruction specifying the target color space.

6. The method of claim 1, wherein implementation of the target color space provides a predefined degree of perceptual similarity between identical pictures presented on each of the multiple displays.

7. The method of claim 1, wherein the multiple displays are implemented in a multi-display device.

8. A system comprising:
   memory;
   a perceptual similarity multi-display color calibrator stored in the memory and executable to:
   determine a native color space for each of multiple displays;
   determine an overlap region between the native color space of each of the multiple displays;
   determine a max perceptual similarity delta, the max perceptual similarity delta representing a maximum shift in the native color space that can be implemented without being visually detectable by a human viewing the multiple displays;
   determining that a predefined standard color space is partially external to the overlap region;
   select a target color space to implement on each of the multiple displays, the target color space representing a shift in the predefined standard color space effective to reduce separation between the predefined standard color space and the overlap region to at or below the max perceptual similarity delta; and
   instruct one or more of the multiple displays to map the associated native color space to the target color space.

9. The system of claim 8, wherein the shift is selected to satisfy a constraint limiting separation between the target color space and the predefined standard color space.

10. The system of claim 8, wherein the target color space resides at least partially within the overlap region.

11. The system of claim 9, wherein the constraint minimizes size of the shift.

12. The system of claim 8, wherein the target color space is a color space that constrains the shift to below a threshold.

13. The system of claim 8, wherein the multiple displays include at least a first display and a second display and the perceptual similarity multi-display color calibrator is further executable to:
   detect a coupling between the first display and the second display;
   based at least in part on the detection of the coupling, discovering, by a processor, the native color space of each of the multiple displays by transmitting at least some display characteristics along the coupling; and
   transmitting an instruction along the coupling, the instruction specifying the target color space.

14. The system of claim 8, wherein implementation of the target color space provides a predefined degree of perceptual similarity between identical pictures presented on each of the multiple displays.

15. One or more tangible computer-readable storage media implementing computer-executable instructions for executing a computer process, the computer process comprising:
   determining a native color space for each of multiple displays;
   determining a max perceptual similarity delta, the max perceptual similarity delta representing a maximum shift in the native color space that can be implemented without being visually detectable by a human viewing the multiple displays;
   identifying an overlap region between the native color space of each of the multiple displays;
   in response to determining that a predefined standard color space is partially external to the overlap region, identifying an accuracy offset in the predefined standard color space that is effective to reduce a separation between the predefined standard color space and the overlap region to at or below the max perceptual similarity delta;
   selecting a target color space that represents the predefined standard color space shifted by the accuracy offset to implement on each of the multiple displays; and
   instructing one of the multiple displays to map the associated native color space to the target color space.

16. The one or more tangible computer-readable storage media of claim 15, wherein selecting the target color space further comprises selecting the accuracy offset that satisfies a constraint limiting size of the accuracy offset.

17. The one or more tangible computer-readable storage media of claim 15,
wherein the target color space at resides at least partially within the overlap region.

* * * * *